No. 821,516. PATENTED MAY 22, 1906.
T. J. LOVETT.
PROCESS OF RECOVERING COPPER AND OTHER VALUES FROM CERTAIN ORES.
APPLICATION FILED JAN. 16, 1906.
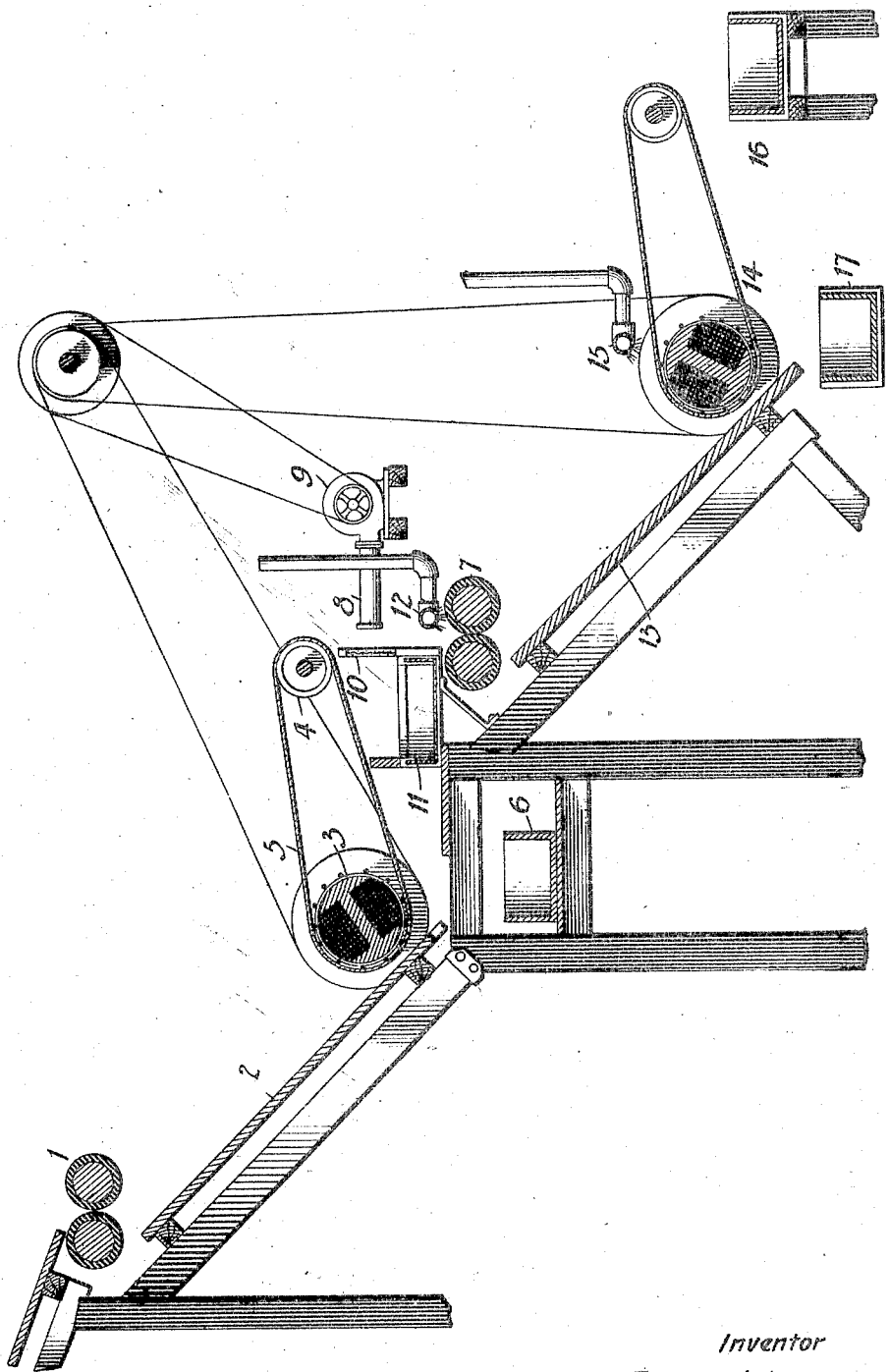
Witnesses
Jos. F. Collins
C. L. Wheepley
Inventor
Thomas J. Lovett
By Dyrenforth, Dyrenforth & Lee
Attorneys

UNITED STATES PATENT OFFICE.

THOMAS J. LOVETT, OF CHICAGO, ILLINOIS.

PROCESS OF RECOVERING COPPER AND OTHER VALUES FROM CERTAIN ORES.

No. 821,516.          Specification of Letters Patent.          Patented May 22, 1906.

Application filed January 16, 1906. Serial No. 296,385.

*To all whom it may concern:*

Be it known that I, THOMAS J. LOVETT, a citizen of the United States, residing at Chicago, in the county of Cook and State of Illinois, have discovered a new and useful Process of Recovering Copper and other Values from Certain Ores, of which the following is a specification.

My invention relates to an improved method of separating, concentrating, and saving the valuable constituents of low-grade copper pyrites or chalcopyrite ores containing a large percentage of magnetic iron, with which is intimately associated sulfids of copper carrying gold and silver. Immense deposits of ore of this character have been found, for example, on the Prince of Wales Island off the southeast coast of Alaska, where the ore exists, for the most part, at least, inclosed in what is termed an "altered Kassan greenstone formation." The largest percentage of mineral in this ore is magnetic iron, and the assay values vary from two to eight per cent. copper and from one dollar to two dollars and fifty cents in gold and silver, according to reliable reports. Hitherto no process has been employed which would operate economically to extract the copper and precious metals from this ore. Efforts have been made to smelt the ore; but the large percentage of iron, as compared with the copper and precious-metal contents, renders the smelting operation, in most cases, at least, unprofitable. Efforts have also been made to concentrate preparatory for smelting the copper and other values by mechanical means, such as vanners, &c.; but the specific gravities of the iron and sulfids are so nearly alike that these efforts have had to be abandoned.

My object is to solve the problem of readily recovering the copper sulfid and any gold and silver associated therewith by a method which will extract and render possible the saving of the iron constituent of the ore and leave in the form of a concentrate the sulfid and precious-metal values.

In practicing my improved method I employ an apparatus such as is illustrated in the accompanying drawing, which is a vertical longitudinal sectional view, and in which—

1 designates a pair of rolls for coarse-crushing the ore in a dry state to comminute the mass, so that it will all pass through a screen of, say, from twelve to twenty mesh. From the crushing-rolls the dry comminuted material passes downwardly over an inclined surface 2 and in its passage is subjected to the action of a suitable magnetic separator, that shown consisting of a magnet-equipped roll 3, around which and a roll 4 an endless apron 5 passes. The material not caught by the magnet falls into a receptacle 6, from which it may be conveyed to the rolls 1 for recrushing. The material caught by the magnet—namely, magnetic iron and sulfid powder adhering to the iron—is conveyed on the upper traverse of the apron 5 and falls therefrom between a pair of crushing-rolls 7, which comminutes the mass to a degree of fineness so that all will pass through a screen approximating forty mesh, in which conditions the iron particles are substantially disunited from the other constituents and approximately complete separation of the iron and sulfid is rendered possible. The iron particles and adhering sulfid powder falling from the apron 5 are practically in a dry state, and to obtain the dislodgment before recrushing of the powder from the iron and reduce very much the production of sulfid slimes I provide the means shown, which consists of an air-nozzle 8, connected with a blower 9 and discharging air under pressure through the falling material. It is to be understood that by the extraction of the sulfid powder, as stated, it is saved from a second crushing, which would reduce much of the particles to a degree of fineness highly undesirable where they are to be subjected to further treatment. A screen 10 of proper mesh may be employed to prevent the deflection of the material in its passage to the rolls 7, and back of this screen is a receptacle 11, receiving the dislodged sulfid powder passing through the screen.

The material, previous to the recrushing step and after the dislodgment of the sulfid powder, is mixed with water discharging from a spray-nozzle 12, so that the second crushing is performed while the material is in a wet state. From the rolls 7 the material passes downwardly over an inclined surface 13 and in its passage is subjected to the action of a magnetic separator 14, similar in construction to the separator hereinbefore described. The material during this second separation is kept in a wet state by water discharging from a nozzle 15. The iron particles caught by the magnet of the separator 14 fall from the apron into a receptacle 16, while the material not caught falls into a receptacle 17. The iron particles, owing to the presence of water, are extracted in a comparatively clean state. The receptacle 17 may be a settling-tank, in which the sulfids and their contained values will precipitate, permitting the water to be drawn off and leaving the sulfid in a highly-concentrated state and in condition for economical smelting. It is to be understood that the second grinding and final separation could be performed while the ore is in a more or less dry state; but such an operation, it has been found, would be less economical and would effect less desirable results.

The process, as hereinbefore described, contemplates the treatment of the material for the concentration and collection of the non-magnetic particles, first, in a dry state and then in a wet condition, whereby in the earlier dry steps the formation of slimes is prevented and the dislodgment of values in the form of powder from the magnetic particles is readily effected, and whereby in the later wet steps purer and cleaner concentrates are obtained and at a cost considerably below that required for a final treatment of the mass in a dry condition. More than two grindings and more than two magnetic separations may be resorted to, though it is believed that in most cases a third grinding and magnetic separation would not result in any material profit. For purposes of economy in treatment the second and subsequent, if any, grindings should be performed while the ore is in a wet state to facilitate the operation and avoid dust losses, and the second and any subsequent magnetic separations should be performed while the mass operated upon is in a fluid state.

It will be seen that my invention consists of a plurality of procedures, which, being performed in proper order, effect my results. It is in the nature of a compound process, and I do not claim as my invention any particular single step thereof, but merely the process or method as a whole. Chalcopyrite ore has never before to my knowledge been treated in the manner described. Not only are the sulfid-of-copper and precious-metal values brought to a high state of concentration for profitable smelting, but the iron may be left in a clean and merchantable condition

What I claim as new, and desire to secure by Letters Patent, is—

The herein-described combined dry and wet process of concentrating and collecting the non-magnetic sulfid and contained values in low-grade chalcopyrite ores carrying a material percentage of magnetic iron, which consists of the steps of coarse-crushing the ore in a dry state to reduce the sulfid and iron and allow of the dislodgment of adhering sulfid powder, magnetically separating from the dry reduced mass the disunited iron particles, dislodging from said dry iron particles and collecting the adhering sulfid powder, comminuting the remaining attracted material in a wet state to a degree of fineness which disunites the remaining iron particles from the other constituents, magnetically separating the disunited remaining iron particles from the wet mass, and finally collecting and saving the sulfid concentrates from the recrushed mass.

THOMAS J. LOVETT.

In presence of—
J. H. LANDES,
A. U. THORIEN.